Jan. 31, 1928.
A. R. WEIS
1,657,651
OIL TUBE TENSIONING MEANS
Filed Aug. 19, 1926
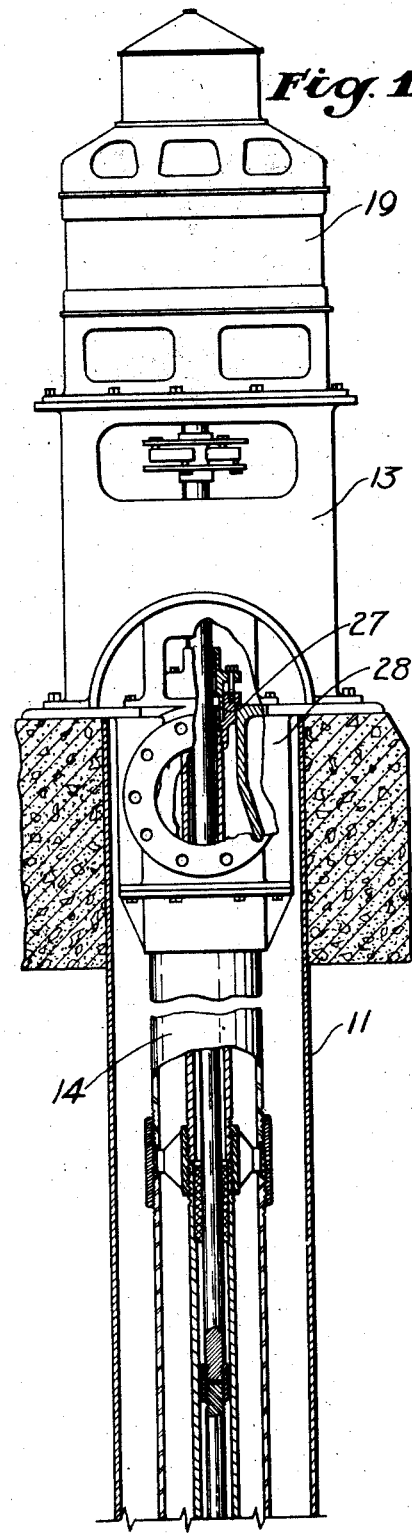
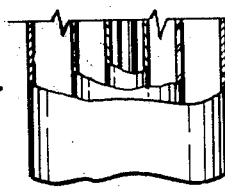
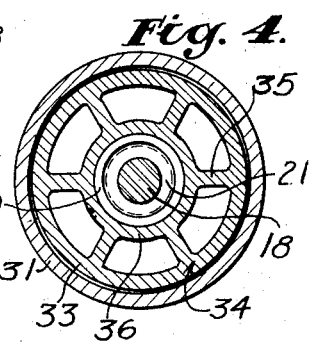
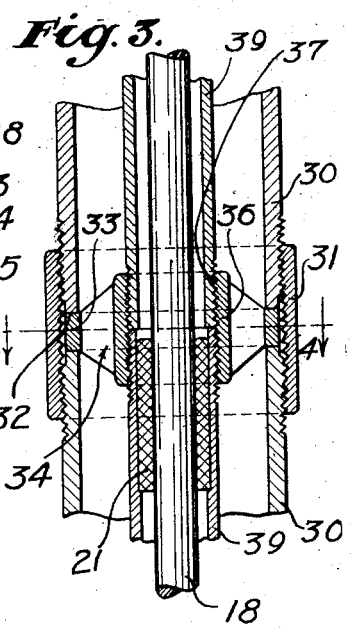
INVENTOR
ARTHUR R. WEIS,
BY
ATTORNEY.

Patented Jan. 31, 1928.

1,657,651

UNITED STATES PATENT OFFICE.

ARTHUR R. WEIS, OF HUNTINGTON PARK, CALIFORNIA, ASSIGNOR TO PACIFIC PUMP WORKS, OF HUNTINGTON PARK, CALIFORNIA, A CORPORATION OF CALIFORNIA.

OIL-TUBE-TENSIONING MEANS.

Application filed August 19, 1926. Serial No. 130,327.

This invention relates to turbine irrigation pumps, a common form of which has a pump section placed near the lower end of a well, and attached to the lower end of a discharge pipe. The discharge pipe is extended into the well from the surface of the ground, and a pump head is mounted at the surface of the ground to which the discharge pipe is attached. Extended from the pump head to the pump section is a pump shaft by means of which the pump section is operated, and surrounding the pump shaft is an oil tube which retains lubrication for pump shaft bearings which are supported by the oil tube. It is common practice to attach the lower end of the oil tube to the upper part of the pump section and to place a tension on it by means of a nut located at the upper end thereof and in the pump head. It is highly desirable for various reasons to maintain a substantial tension on the oil tube. One reason is to keep the oil tube absolutely concentric so that the bearings will support the pump shaft in exact axial alignment so that there will be no whipping of the shaft. The present manner of applying tension to the oil tube is not entirely satisfactory. A considerable degree of tension is applied to the upper end of the oil tube, but by reason of the weight thereof the oil tube has less tension at the lower end. One big objection to and deficiency of this method of applying tension is that the initial tension very often diminishes, because of the great distance and many joints between the upper and lower ends, so that it is possible for the oil tube to move out of concentricity and for the pump shaft to whip.

It is one of the important objects of this invention to provide a pump of the character mentioned in which tension is applied to the oil tube at intervals between the upper and lower ends.

A further object of this invention is to provide a pump in which tension is applied to the oil tube while the pump is being assembled.

It is very essential that the oil in the oil tube be prevented from leaking out and that the water in the column pipe be prevented from leaking into the oil tube. If any water gets into the oil tube it adulterates the oil and may prevent one or more shaft bearings from getting proper lubrication.

It is one of the objects of this invention to provide a pump in which the oil tube will have fluid-tight joints.

A still further object of the invention is to provide a pump having a novel means for applying tension to the oil tube and for forming fluid-tight joints between the different tubing members.

Other objects and advantages of the invention will be made evident throughout the following description.

In the description to follow I illustrate the invention applied to a particular design of turbine irrigation pump. It should be understood, however, that various modifications may be made and that the invention may be embodied in a different species of pump without departing from the spirit and scope of the invention. The invention may be best understood by referring to the drawing in which:

Fig. 1 is a vertical view partially sectioned of the upper end of a pump.

Fig. 2 is an elevational view partially sectioned of the lower end of a pump.

Fig. 3 is an enlarged vertical fragmentary section showing the tensioning means of the invention.

Fig. 4 is a section taken on lines 4—4 of Figs. 1 and 3.

Referring in detail to Figs. 1 and 2 of the drawing, a well casing 11 is extended into a well. Mounted on a foundation 12 at the upper end of the well is a pump head 13 and extending downward from the pump head 13 into the well is a column pipe or discharge pipe 14. Secured to the lower end of the discharge pipe 14 is a pump unit or pump section 15, this pump section 15 being situated near the lower end of the well and below the water level thereof. The pump section 15 has impellers 17 which are mounted on a pump shaft 18. The pump shaft 18 extends upward through the discharge pipe 14 and is drivably connected with a motor 19 which forms a part of the pump head 13.

Surrounding the pump shaft 18 is an oil tube 20 which carries bearings 21 in which the pump shaft 18 is journaled. The lower end of the oil tube 20 is screwed into a socket 23 of a lower bearing 24. The lower bearing 24 is threadedly secured to a hub portion 25 which forms a part of an upper casting of the pump section 15. The upper end of the oil tube 20 is threadedly secured to a packing member 27 which is supported by a discharge casting 28 of the pump head 13.

The oil tube 20 is supported at intervals between the upper and lower ends thereof by tensioning means illustrated best in Figs. 3 and 4. Referring to these figures the discharge pipe 14 is made up of lengths of pipe 30 which are threaded at the ends thereof and which are secured together by couplings 31. Adjacent ends 32 of the lengths of pipe 30 engage opposite faces of a ring 33 of a tensioning spider 34. The spider 34 is rigidly secured in place by the engagement of the faces 32 of the pipe 30 with the faces of the ring 33. Extending radially inward from the ring 33 is a plurality of webs 35. Formed integral at the inner ends of the webs 35 is a hub 36 which is provided with internal threads 37. The oil tube 20 is composed of lengths of tubing 39 which are threaded at the ends thereof. The threaded ends of the tubing 39 are screwed into the hub 36 of the tensioning spider 34, thus being secured together. The tensioning spider 34 not only supports the tubing in a concentric position but also places a tension on the different lengths thereof. The tension is placed on the tube 20 when the pump is being assembled and is placed thereon in the following manner.

Referring to Fig. 3, the lower pipe 30 and the lower tubing 39 having been already assembled, the next operation is to install the tensioning spider 34. The tensioning spider 34 is placed above the upper threaded end of the lower tubing 39 and rotated so that it is screwed downward thereon. The lower face of the ring 33 will come in contact with the face 32 of the lower pipe 30. At this time a down pressure will be exerted on the lower pipe 30 and a tension will be applied to the lower tubing 39. After the ring 33 has engaged the lower pipe 30, the tensioning spider 34 will not move downward but the upper end of the lower tubing 39 will be pulled upward. The tensioning spider 34 may be turned until any desired tension is placed on the tubing 39. The upper tubing 39 is then screwed into the hub 36 until the end thereof engages the upper end of the lower tubing 39 and forms a leak-proof butt joint which prevents oil from leaking out of the oil tube and water from leaking into the oil tube. The coupling 31 is then screwed onto the lower pipe 30 whereafter the upper pipe 30 is screwed in place so that the end face 32 thereof grips the upper face of the ring 33. This procedure of assembling is carried out until the entire discharge pipe has been assembled. The discharge casting 28 is then secured in place and the packing member 27 is then assembled in place so that a tension is applied to the length of tubing 39 between the upper tensioning spider 34 and the packing member 27.

There are various advantages accruing from the invention. One prominent advantage is that a uniform and permanent tension is applied to the oil tube 20 throughout its entire length. A tensioning spider 34 is placed at every section of the discharge pipe 14. Ordinarily, the length of the pipe 30 is about twenty feet long; therefore, tension will be applied to the oil tube 20 at every twenty feet. It will be seen that the oil tube will be held absolutely concentric and the bearings 21 will maintain the pump shaft 18 in accurate axial alignment so that there can be no whipping thereof and no attendant stresses which would bring about a premature breakage of the pump shaft.

It is an important feature of the invention to connect the tubing members of the oil tube together in such a manner that leak-proof joints will be provided. This retains the oil in the oil tube and prevents water from leaking thereinto. A very important advantage of the invention is that not only is the oil tube maintained under a tension throughout its entire length, but leak-proof butt joints are also provided. This is possible only by the novel construction shown. It is essential that the upper length of tubing 39 be capable of screwing into the hub 36 to engage an upper end of the lower length of tubing 39. It is also essential that the lower length of tubing 39 be capable of screwing upward into the hub 36 a sufficient distance to place the proper tension thereon. These two things are possible only by providing the hub 36 with a uniform internal diameter. In order to obtain the leak-proof joint it is absolutely necessary that a butt contact be had between the two adjacent tubing members. The tubing members 39 both include end faces which are in contact. These end faces, however, need not be the end faces of the seamless tubing per se, but may be the end faces of parts which form a part of the structure included in the tubing member. As an example, it may be desired to secure the bearing 21 in place by providing it with an annular flange which projects outward above the upper end of the tubing member per se, the bearing 29 being a press fit. If this were the case, the upper face of the bearing 21 would actually be the upper face of the lower tubing member 39 and such a construction as this is equivalent to that illustrated in Fig. 3.

Another important advantage of the invention is that it greatly simplifies the means for connecting the pipes 30 of the discharge pipe 14 together and also simplifies the manner of supporting the oil tube 20. At the present time it is necessary to provide a very heavy casting which has an outer cylindrical coupling portion built integral with a web and hub portion. These parts are usually made of cast-iron because the cost of a better and more desirable metal is too much. In my invention the parts are made separate and permit high grade metal to be used at a much less cost than that of the present constructions made of cast-iron. The coupling 31 is made of steel which is very strong and the tensioning spider 34 may be made of bronze and is non-corrosive and very practical for this use.

From the foregoing description it should be evident that the broad conception of my invention comprehends the idea of placing tension on the oil tube at the successive points throughout the length thereof, and that the invention also comprehends a specific means for accomplishing the broad purpose of the invention; namely, the tensioning spider 34 and the coupling 31.

I claim as my invention:

1. In a pump, the combination of: a pump unit; a pump head; a discharge pipe connected to said pump unit and said pump head, said discharge pipe including a plurality of pipes connected together by a coupling; a pump shaft connected to said pump unit and said pump head; an oil tube surrounding said shaft, said oil tube including a plurality of tubing members; and means secured between the end faces of said plurality of pipes for connecting said tubing members together, thus forming a fluid leak-proof butt joint, and for placing a tension thereon, said means comprising an outer ring supported between ends of said pipes, a hub in which the ends of said tubing members are secured, the ends of said tubing members being in butt contact, and webs connecting said hub and said outer ring.

2. In a pump, the combination of: a pump unit; a pump head; a discharge pipe connected to said pump unit and said pump head, said discharge pipe including a plurality of pipes connected together by a coupling; a pump shaft connected to said pump unit and said pump head; an oil tube surrounding said shaft and attached to said pump unit, said oil tube including a plurality of tubing members; and means secured between the end faces of said plurality of pipes for connecting said tubing members together, thus forming a fluid leak-proof butt joint, and for placing a tension thereon, said means comprising an outer ring supported between ends of said pipes, a hub in which the ends of said tubing members are secured, so that a butt joint is formed in said hub by said tubing members, and webs connecting said hub and said outer ring.

3. A tensioning spider for applying tension and connecting the oil tube of a pump having a column pipe made up of individual joints joined by suitable couplings comprising: a ring adapted to fit between the ends of said joints of column pipe inside the coupling therefor; a hub inside and concentric with said ring, said hub having a cylindrical opening therein which is threaded to take the ends of adjacent joints of oil tube; and webs connecting said hub with said ring.

4. In a pump, the combination of: a pump unit; a pump head; a discharge pipe connected to said pump unit and said pump head, said discharge pipe including a plurality of pipes connected together by a coupling; a pump shaft connected to said pump unit and said pump head; an oil tube surrounding said shaft, said oil tube including a plurality of tubing members; and means secured between the end faces of said plurality of pipes for connecting said tubing members together, said means having a threaded portion adapted to threadedly receive the adjacent ends of said tubing members for forming a fluid leak-proof butt joint, and for placing a tension thereon.

5. In a pump, the combination of: a pump unit; a pump head; a discharge pipe connected to said pump unit and said pump head, said discharge pipe including a plurality of pipes connected together by a coupling; a pump shaft connected to said pump unit and said pump head; an oil tube surrounding said shaft and attached to said pump unit, said oil tube including a plurality of tubing members; and means secured between the end faces of said plurality of pipes for connecting said tubing members together, said means having a threaded portion adapted to threadedly receive the adjacent ends of said tubing members for forming a fluid leak-proof butt joint, and for placing a tension thereon.

In testimony whereof, I have hereunto set my hand at Los Angeles, California, this 13th day of August, 1926.

ARTHUR R. WEIS.